(No Model.)

4 Sheets—Sheet 1.

W. B. CLEVELAND.
ELECTRIC SWITCH.

No. 391,512.  Patented Oct. 23, 1888.

Witnesses.
C. B. Nash.
E. J. Climo.

Inventor,
W. B. Cleveland,
By his Attorney
Thos. B. Hall.

(No Model.)

W. B. CLEVELAND.
ELECTRIC SWITCH.

No. 391,512. Patented Oct. 23, 1888.

4 Sheets—Sheet 2.

Witnesses.
C. B. Nash,
E. J. Climo.

Inventor.
W. B. Cleveland.
By his Attorney
Thos. B. Hall.

(No Model.)  4 Sheets—Sheet 3.

W. B. CLEVELAND.
ELECTRIC SWITCH.

No. 391,512. Patented Oct. 23, 1888.

(No Model.) 4 Sheets—Sheet 4.

W. B. CLEVELAND.
ELECTRIC SWITCH.

No. 391,512. Patented Oct. 23, 1888.

Witnesses,
C. B. Nash.
E. J. Olmo.

Inventor.
W. B. Cleveland.
By his Attorney
Thos. B. Hall.

UNITED STATES PATENT OFFICE.

WILLIAM B. CLEVELAND, OF CLEVELAND, OHIO.

ELECTRIC SWITCH.

SPECIFICATION forming part of Letters Patent No. 391,512, dated October 23, 1888.

Application filed July 25, 1885. Serial No. 172,620. (No model.)

*To all whom it may concern:*

Be it known that I, WILLIAM B. CLEVELAND, a citizen of the United States, residing at Cleveland, county of Cuyahoga, and State of Ohio, have invented certain new and useful Improvements in Electric Switches, of which the following is a specification.

The object of the invention is to provide an improved construction of spring movement for operating the contact-bar, respectively, in its making or breaking circuit.

The invention consists, broadly speaking, in combining together a primary actuating device, a movable contact-bar, and a spring connected, respectively, with said two parts, said primary actuating device having a range of movement wherein the line of said two spring-connected points may pass, respectively, to opposite sides of the dead-center line of the spring movement, the spring being under compression or tension between the primary actuating device and the contact-bar, thereby throwing the latter in a quick movement either to open or closed position, accordingly as the line of spring-power may be shifted to one side or the other of said dead-center line.

Figure 1:
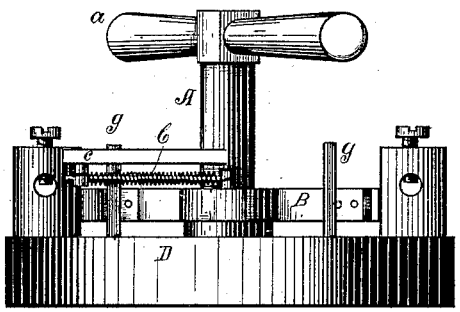
Figure 2:
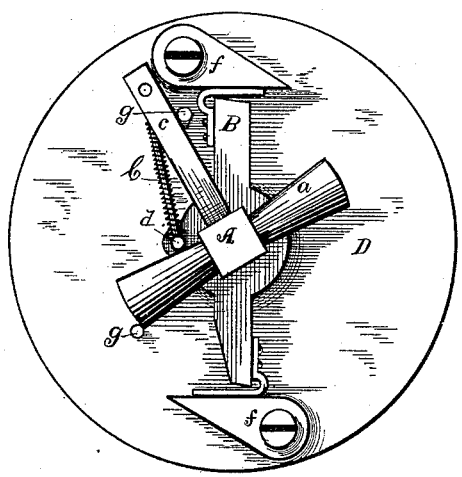
Figure 3:
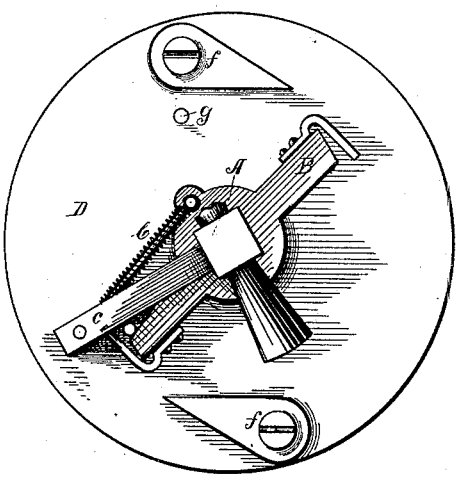
Figure 4:
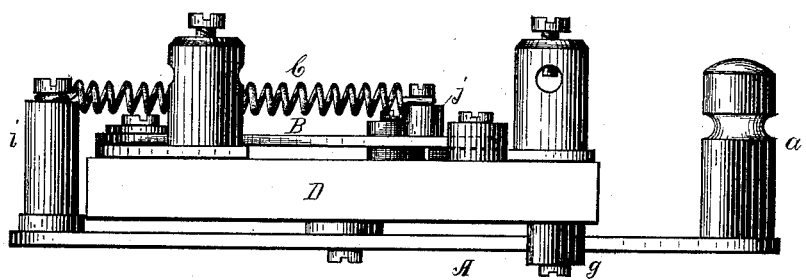
Figure 5:
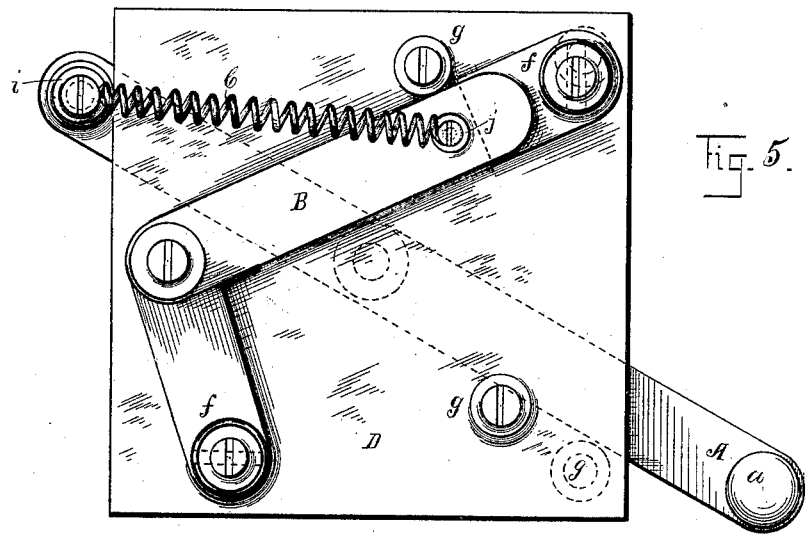
Figure 6:
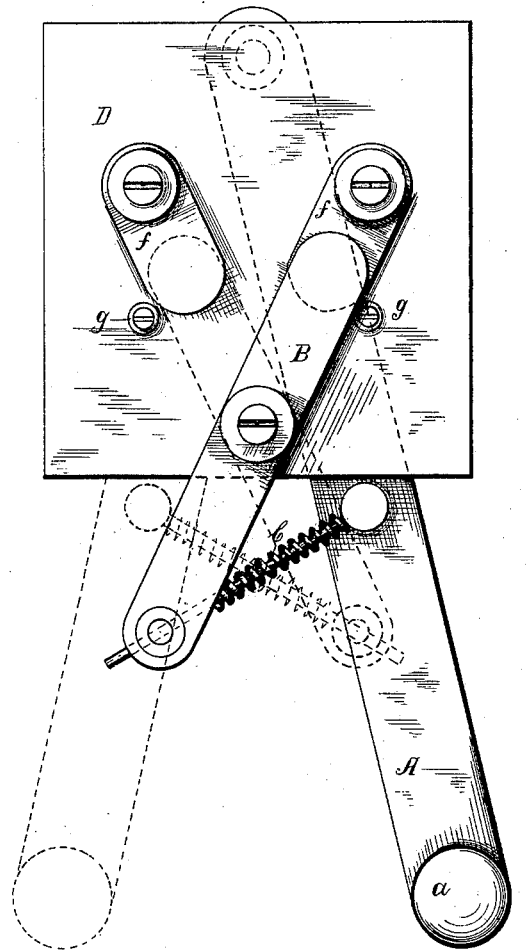
Figure 7:
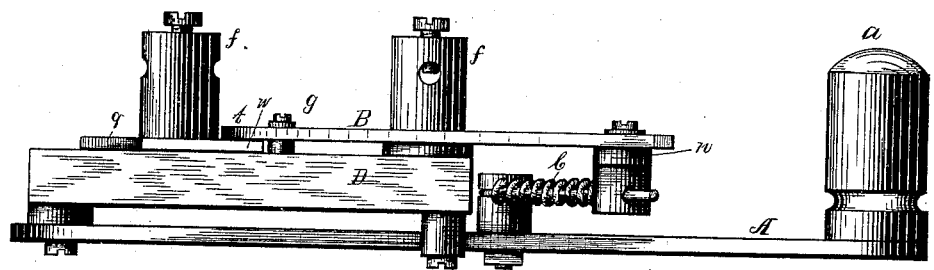
Figure 8:
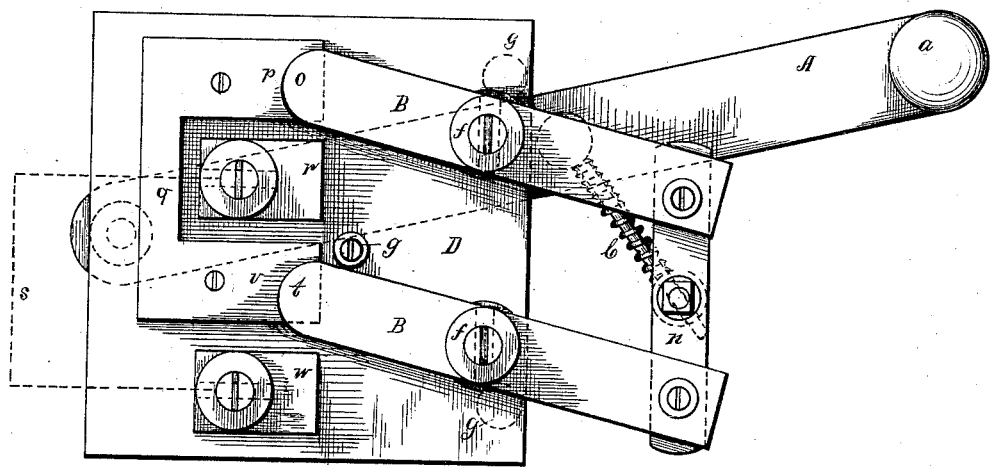
Figure 9:
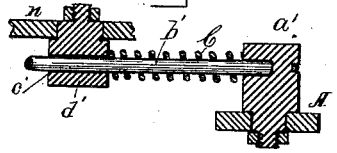

In the drawings, Figure 1 is a side elevation of one form of switch, shown closed. Fig. 2 is a plan view of the same. Fig. 3 is a plan view of the same switch, shown open. Fig. 4 is a side elevation of a second form of switch. Fig. 5 is a plan view of the latter. Fig. 6 is a plan view of a third form of switch. Fig. 7 is a side elevation of a fourth form of switch. Fig. 8 is a plan view of the latter. Fig. 9 is a detail view of the spring movement shown in said fourth form.

In the first form of switch the primary actuating device A is pivoted concentric with a contact-bar, B, said two parts thus having their pivotal axes in line with each other. A spring, C, is connected, respectively, to said primary actuating device and contact-bar, said primary actuating device having a range of pivotal movement, whereby it may be shifted to such different positions as to cause the line of said two spring-connecting points to pass, respectively, to either one of the opposite sides of the pivotal axis of said contact-bar, as the case may be, at will of the operator, the spring operating to throw the contact-bar in a quick movement either to open or closed position, accordingly as said primary actuating device is moved to position, wherein its spring-carrying point may shift the line of spring-power, as above stated, to effect the desired result, said spring also operating to hold the contact-bar in such changed position. The primary actuating device is provided with a suitable handle, *a*, and also with an arm, *c*, to the free extremity of which one extremity of the spiral spring C is connected by shifting bearing, the opposite extremity of the spring being likewise connected by shifting bearing to a lateral projection, *d*, of the contact-bar, the detail construction of the spring movement being substantially the same as the spring movement of Fig. 9. In this form of switch, and also, respectively, in the other forms of switch herein shown, the primary actuating device and the contact-bar are suitably mounted on a base, D, said base being further provided with suitable circuit-terminals, *f*, and with suitable stops, *g*, said stops being for limiting the throw of the contact-bar and also of the primary actuating device as said two parts are, respectively, thrown in opposite directions by the spring movement as the line of spring-power is shifted to either side of the dead-center line, said stops thus maintaining the primary actuating device and the contact-bar in normal position.

In the second form of switch shown the primary actuating device A is a lever of the first order centrally pivoted to the central portion of the reverse face of a base, D, and provided at its working extremity with a right-angular arm, *i*, to which one end of a spiral spring, C, is directly connected in loose or shifting engagement, the opposite end of the spring being likewise directly connected in loose or shifting engagement to a similar arm, *j*, projecting at right angles from one extremity of the contact-bar B, the contact-bar in this latter form being pivoted to the base at its extremity opposite to its spring-connecting extremity, and the parts being relatively located so that the spring itself crosses the line of the pivotal axis of the contact-bar in the shifting of the line of spring-power, respectively, to opposite sides of the line of said pivotal axis.

In the third form of switch shown the primary actuating device A is a lever of the second order pivoted at one extremity to the center of one marginal portion of the reverse face of a base, D, the contact-bar B being centrally pivoted to the center of the face of the opposite marginal portion of the base, the spring C being connected with said lever and contact-bar, the specific form of spring movement shown being the same as that of Fig. 9.

The fourth form of switch shown represents the invention as applied to a double-pole switch, two contact-bars, B, being respectively pivoted to a base, D, and having their extremities opposite to their contact extremities connected together by a link, $n$, of insulating material pivoted to each. The contact extremity $o$ of one of the contact-bars connects with the contact-point $p$ of the closed circuit $q$, or with the contact-point $r$ of the lamp-circuit $s$. The contact-extremity $t$ of the companion contact-bar connects with either the contact-point $v$ of the closed circuit $q$, or with the contact-point $w$ of the lamp-circuit $s$. The primary actuating device A in this instance is a lever of the second order, pivoted at one extremity to the reverse face of the base D, the spring C being connected to said lever and link $n$ in the specific form shown by the spring movement of Fig. 9, said lever being provided with a stud, $a'$, pivoted thereon and rigidly connected to one extremity of rod $b'$, the opposite extremity of said rod having free longitudinal movement in a slot, $c'$, formed in stud $d'$, which latter is pivoted to the middle portion of the link $n$, fitted on rod $b'$, and between the two studs $a'$ $d'$ being the spiral spring C, having end bearings, respectively, against said two studs.

The operation of the invention is substantially the same in each of the different forms of switch shown. In each instance the range of pivotal movement of the primary actuating device is such as to permit it to carry its spring-connecting point to such different locations as to shift the line of spring-power (the line of points, respectively, of the primary actuating device and the contact-bar which connect with the spring) to either the one side or the other side of the pivotal axis of the contact-bar, as the case may be, the spring being under compression or tension between the primary actuating device and the contact-bar, and throwing the contact-bar in a quick movement either to open or closed position, as the case may be, such movement of the contact-bar being effected solely by the shifting of the line of said spring-power from the one side to the other side of the line of the pivotal axis of the contact-bar—that is, the primary actuating device has a range of pivotal movement which permits the line of spring-power to be shifted, respectively, to opposite sides of the dead-center line of the spring movement, said dead-center line being the line of the two spring-connected points when passing transversely through the line of the pivotal axis of the contact-bar. When the primary actuating device is operated so as to cause said line of spring-power to pass to either side of said dead-center line, then the power of the spring is operative upon the movement of the contact-bar and throws the latter either into open or closed position, as the case may be. The power of the spring is also operative to hold the contact-bar in its changed position.

The operating force of the spring may be either that of compression or tension. Examples of compression are shown. In the first form of my invention illustrated in Figs. 1, 2, and 3; in the third form illustrated in Fig. 6, and in the fourth form illustrated in Figs. 7, 8, and 9; and an example of tension is shown in the second form of my invention, illustrated in Figs. 4 and 5. In each of the forms represented the spring connecting the primary actuating device and the movable contact-bar is a two-throw spring—that is, it operates the contact-bar both in making and breaking the circuit by a positive spring movement, which movement in making contact is precisely opposite to the movement in breaking the contact. This positive spring movement of the contact-bar, both in its making and breaking circuit, is due to and is the result of the combination with the two members, the primary actuating device and the movable contact-bar, of the third member, the two-throw spring; and in the claim the term "two-throw spring" is employed in this sense. In each of the forms shown the maximum of spring force exists when the parts are in position such that the spring movement is in dead-center line; and the minimum of spring force exists when the primary actuating device is at either one of the two termini of its range of movement.

I have represented in the foregoing description and drawings certain exact forms of detail construction in embodiment of my invention for the purpose of fully explaining the principle of construction and operation of the latter; but other forms could be made, all employing the same principle as herein set forth and differing only in mechanical expressions of the same. Hence it will be understood that changes may be made as regards mechanical forms, provided the principles of construction respectively set forth in the following claims are employed; and it will be further understood that the term "electric switch" is therein used in its broadest sense, signifying any form of device wherein an electric current is cut out or switched, or wherein an electric current is broken or controlled, and the like.

I therefore particularly point out and distinctly claim as my invention—

1. In an electric switch, the combination of a primary actuating device, a movable contact-bar, and a spring connected, respectively, with said two members, said primary actuating device having a range of movement wherein the line of said two spring-connected points may pass, respectively, to opposite sides of the dead-center line of the spring movement, substantially as set forth.

2. In an electric switch, the combination of a movable contact-bar, a two-throw spring the opposite ends of which are permanently connected to the contact-bar and to a spring-actuating device, respectively, and said spring-actuating device, which shifts the position of the spring, and thereby causes it to exert its power upon the contact-bar in either of two opposite directions, and also hold it in its changed position, substantially as set forth.

3. In an electric switch, the combination of a pivotal primary actuating device, a pivotal contact-bar, and a spring having its opposite extremities respectively connected to said first two members eccentrically, said primary actuating device having a range of pivotal movement wherein the line of said two spring-connected points may pass, respectively, to opposite sides of the line of the pivotal axis of the contact-bar, substantially as set forth.

4. In an electric switch, the combination, with a pivotal primary actuating device and a pivotal contact-bar having their pivotal axes in line with each other, of a spring connected, respectively, with said first two members, said primary actuating device having a range of pivotal movement wherein the line of said two spring-connected points may pass, respectively, to opposite sides of the line of said pivotal axes, substantially as set forth.

5. In an electric switch, the combination of a pivotal primary actuating device, a pivotal contact-bar, and a spring connecting said two members, said primary actuating device having a range of rotary movement wherein at different times the line of said two spring-connected points may pass, respectively, through and to one side of the line of the rotary axis of the contact-bar, substantially as set forth.

In testimony that I claim the foregoing to be my invention I have hereunto set my hand this 18th day of July, A. D. 1885.

WILLIAM B. CLEVELAND.

Witnesses:
THOS. B. HALL,
J. G. HALL, Jr.